2,242,471

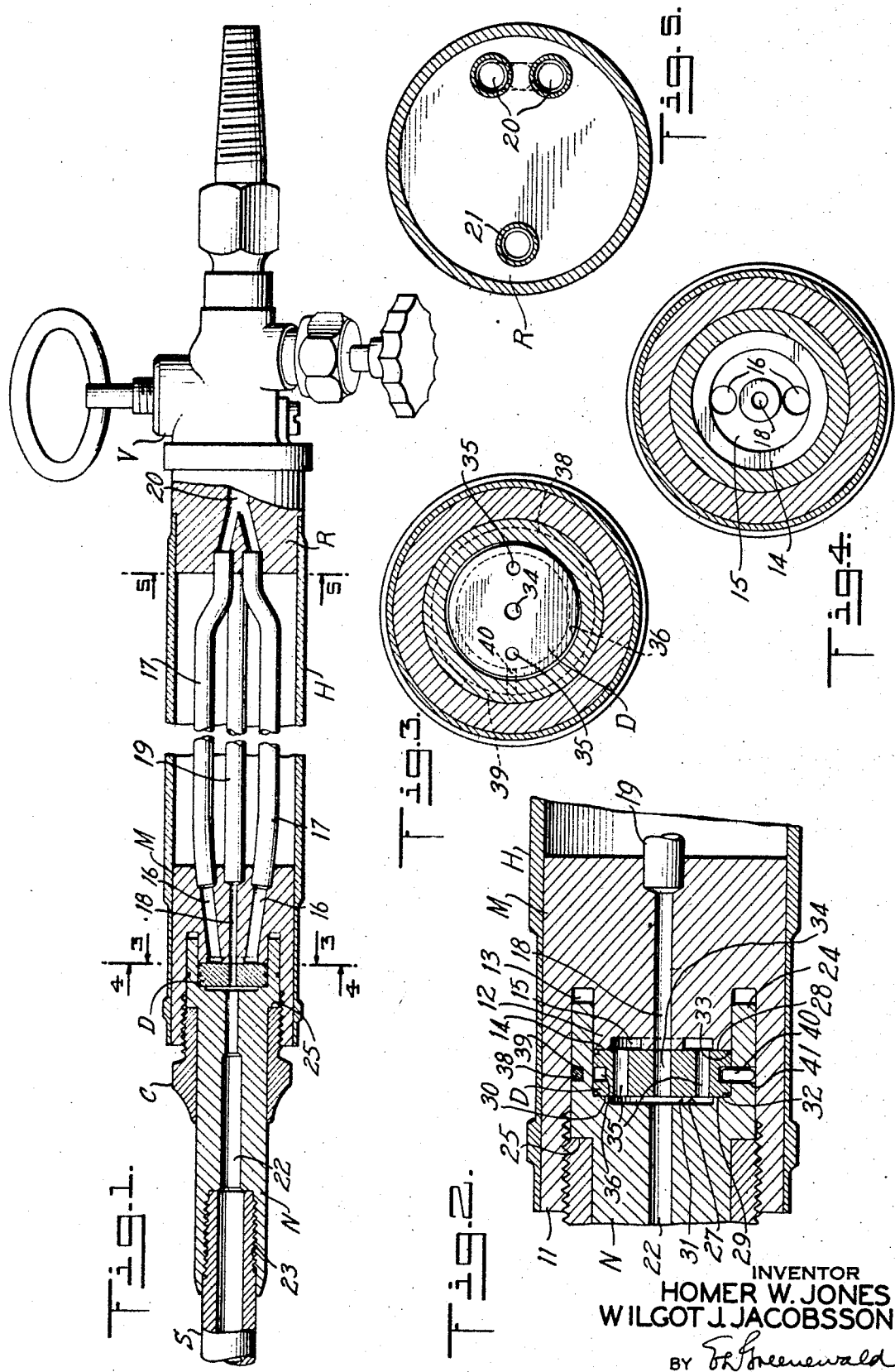
May 20, 1941.  H. W. JONES ET AL  2,242,471
BLOWPIPE
Filed Nov. 29, 1938
INVENTOR
HOMER W. JONES
WILGOT J. JACOBSSON
BY *Th. Greenewald*
ATTORNEY Patented May 20, 1941

UNITED STATES PATENT OFFICE 2,242,471

BLOWPIPE

Homer W. Jones, Westfield, and Wilgot J. Jacobsson, Scotch Plains, N. J., assignors to Oxweld Acetylene Company, a corporation of West Virginia Application November 29, 1938, Serial No. 242,928

12 Claims. (Cl. 158—27.4)

This invention relates to blowpipes, and particularly to welding blowpipes adapted to use medium pressure fuel gas efficiently and without danger of flashbacks.

Blowpipes of this type include three essential elements, namely, a mixing nozzle, a mixing throat, and a gas discharging nozzle. Commonly employed mixing nozzles for blowpipes of this general class are of the injector type which require a great number of machining operations and are therefore relatively expensive to manufacture. Furthermore, such injector nozzles occupy a relatively large space within the blowpipe; possess a limited gas consumption range for a given size; and have little if any flashback resistance per se, thus requiring auxiliary means for preventing flashbacks.

An object of this invention is to provide a simple, inexpensive, rugged, foolproof, and economical blowpipe capable of overcoming the above and other difficulties.

Other objects of this invention include the provision of such a blowpipe having a gas mixing assembly requiring few machining steps in its manufacture; the provision of such a blowpipe having a gas mixing nozzle capable of a wider range of gas consumption than a corresponding mixer of the injector type; the provision of such a blowpipe having a gas mixing assembly constructed to impart a high flashback resistance to the blowpipe; and the provision of such a blowpipe having a readily removable mixing nozzle associated with the blowpipe stem.

The above and other objects of the invention will become apparent from the following description, taken in connection with the accompanying drawing wherein:

Fig. 1 is a view partly in longitudinal section and partly in side elevation of a welding blowpipe embodying the principles of the invention;

Fig. 2 is an enlarged sectional view of a part of the welding blowpipe, taken 90° from the section shown in Fig. 1; and Figs. 3, 4 and 5 are enlarged cross-sectional views taken along the lines 3—3, 4—4 and 5—5, respectively, in Fig. 1.

According to the present invention, a medium pressure welding blowpipe is provided having an improved gas mixing assembly whereby flashbacks may be prevented. The mixing assembly includes a cylindrical disc-shaped mixing nozzle disposed within a chamber in the blowpipe and having an axial passage and two eccentrically arranged passages extending therethrough. Suitable fuel gas and combustion-supporting gas supply conduits are provided, as well as a combustible gas mixture conduit leading from a mixing throat to a welding tip.

For convenience the words "oxygen" and "acetylene" will be used to denote, respectively, any appropriate combustion-supporting gas and any appropriate fuel gas.

In the present embodiment, the blowpipe comprises a cylindrical handle H, having at the rear end thereof a detachable valve body V connected to a rear body R. The forward end of said handle is provided with a body M connected by a hollow coupling nut C to a mixer member or nipple N which latter communicates through a stem S with a welding tip (not shown). The body M and the mixer member N are provided with cooperating portions which form, upon assembly, a recess within which a disc-shaped mixing nozzle D is rigidly clamped. The valve body V comprises no part of the present invention,—it is specifically described and claimed in United States Patents Nos. 1,989,649 and 1,989,079 granted to Worthy C. Bucknam.

Body M comprises a cylindrical member having a chambered forward end forming a projecting annular flange 11 and a cylindrical boss 12 disposed within said chamber, concentric with flange 11, and spaced from said flange by a relatively deep annular recess 13. The forward face 14 of boss 12 is flat and transverse to the longitudinal axis of body M. The face 14 is provided with a shallow and relatively wide annular gas distributing recess 15, communicating, by means of two longitudinal gas supply passages 16, with two oxygen conduits 17 within the handle H. Body M is further provided with a longitudinal axial gas supply passage 18, the forward end of which opens into the chamber of body M, and the rear end of which communicates with an acetylene conduit 19, also within handle H. The two oxygen conduits 17, and the acetylene conduit 19 may be connected to the body M by silver soldering or any other suitable means, and in the same manner they may be connected to the rear body R, which latter is provided with oxygen and acetylene passages 20 and 21 communicating with said conduits respectively.

Mixer member N, in the present embodiment, comprises a nipple having a longitudinal gas mixing conduit or throat 22, of progressively increasing diameter toward its forward end and within which the mixed gases may expand, thereby further insuring their complete mixing and also effecting a decrease in the velocity of the mixed gases. The forward end of mixer member N is provided with an internally threaded counterbore 23 adapted to receive the externally threaded stem S. The rear end of mixer member N is chambered or recessed, thereby forming a rearwardly extending annular flange 24. The outside diameter of flange 24 is greater than that of the main mixer body, and forms therewith an external annular shoulder or abutment 25. The flange 24 is adapted to fit within the chamber of, and to slidingly cooperate with the annular recess 13 within, the body M. In order to provide space for the disc-shaped nozzle D, flange 24 is of sufficient length to slidingly fit within the annular recess 13 and still provide a cylindrical space between the face 14 of boss 12 and the bottom wall 27 of the chamber within member N. Thus it may be seen that flange 24 forms a cylindrical space, having flat ends 14 and 27, which ends are transverse to the longitudinal axis of the mixing throat 22.

The disc-shaped nozzle D, which is symmetrical about its transverse axis, is provided with identical flat parallel faces 28 and 29, either of which may cooperate with an annular shoulder 30 formed between flange 24 and the bottom wall 27 of member N to accurately space nozzle D within the chamber or recess in said member N and to form a narrow circular mixing gap 31 between the bottom wall 27 and the one face of nozzle D. In order to insure the proper seating of the nozzle D on the shoulder 30, and so that the fillet between said shoulder and flange 24 will not interfere with such seating, nozzle D is provided with two annular edge notches 32 and 33.

With the construction described, it is obvious that nozzle D may be inserted with either of faces 28 or 29 to the front without affecting the operating characteristics of the blowpipe. Additionally, it is apparent that the relative thinness of the nozzle D requires a minimum of space within the blowpipe, thereby affording a degree of compactness not possible with injector type mixing nozzles.

Nozzle D is further provided with an axial passage 34 of uniform cross-section adapted to register with the acetylene supply passage 18, which latter extends through body M. Nozzle D is also provided with a pair of eccentrically arranged diametrically opposed metering passages 35 located on opposite sides of passage 34. The entrance ends of these passages 35 are adapted to communicate with the recess 15, while the exit ends are adapted to communicate with the narrow circular gap 31. Each of the passages 34 and 35 is wholly enclosed and has orifices on both the front and rear nozzle faces. In order to afford a maximum restriction to the passage of backfires, these passages 35 are located as far as possible from the axial center line of disc nozzle D, but still communicating with recess 15 and gap 31. Additionally, the nozzle D is provided with a peripheral groove 36 for a purpose to be described later.

As shown in Figs. 1 and 2, the rear end of mixer member N, carrying nozzle D, is disposed in the recess or socket in body M in such a way that flange 24 snugly fits within recess 13 and nozzle face 28 is contiguous with the flat forward face 14 of boss 12. The externally threaded portion of the hollow coupling nut C is adapted to engage the internally threaded body flange 11 while the rear end of said nut adjacent said threaded portion is adapted to bear firmly against shoulder 25. Thus, upon assembling the parts and tightening the nut C, the flat face 28 of nozzle D is urged against the flat face 14 of boss 12, thereby forming a seal between the acetylene passage 18 and the oxygen recess 15, as well as between said recess and the atmosphere. When thus secured, the assembly is, in effect, a unitary body having a chamber in which a mixing nozzle D is rigidly clamped with its forward face 29 spaced from the forward wall 27 of the chamber, and its rear face 28 coinciding with and bearing tightly against the flat face 14 of boss 12.

From the construction of the blowpipe as described in the preceding paragraphs, it is apparent that the construction of nozzle D affords excellent flashback resistance. For example, upon the occurrence of a backfire, the burning gases travel rearwardly through the throat 22, and a portion of the burning gases passes into the acetylene conduit 19 and a portion into the oxygen conduits 17, where they combine with the pure acetylene or oxygen respectively. In order for the burning gases to pass into the oxygen conduits, they must make an abrupt 90° turn and pass radially outwardly through the narrow gap 31. At the outer extremity of gap 31, the burning gases must make another abrupt 90° turn and pass rearwardly through metering passages 35 to recess 15. The burning gases may then make another change in direction across recess 15 to the entrances to passages 16 in body M before entering the latter passages. These abrupt changes in the direction of flow of the gases, together with the metering effect due to the narrow oxygen passages, dissipate the heat and momentum of the gases and prevent a large volume of gases from entering into the conduits 17, where the heat would not be as readily dissipated and the burning would take place with explosive rapidity, thereby decreasing the rate of burning. When the gases resume flowing in the forward, normal direction there will be no sustained or repeated flashback.

From the foregoing description of body M, mixer member N, and mixing nozzle D, it may be seen that they may be produced from either bar stock or rough castings by the simplest of machining operations, thus considerably reducing the manufacturing cost. Inasmuch as the manufacturing cost of the nozzle D is low, it is possible to provide one for each mixer member N. Thus, it is possible with a series of mixer units N, each including its own nozzle D, and a single blow-pipe body, to cover the entire field of welding. Furthermore, each unit N with its separate nozzle D will cover a greater range of gas consumption than a corresponding unit employing an injector type of nozzle.

In order to connect the nozzle D with the member N so that it may be readily removed for cleaning, repair, and replacement, and to prevent nozzle D from falling out when member N is removed from the blowpipe, a resilient retaining means is provided. The retaining means comprises a segmental spring ring 38 within a peripheral groove 39 in the flange 24 of member N, having an end 40 bent at a right angle and adapted to pass through an aperture 41 which extends from the bottom of groove 39 through the wall of flange 24. The spring end 40 fits loosely within a peripheral groove or slot 36 in nozzle D, permitting rotating movement and limited longitudinal movement thereof. Thus it is observed that nozzle D may be inserted within the chamber formed by flange 24 and held therein by the spring ring 38. Its removal may be effected by simply withdrawing inwardly turned end 40 of spring 38. By virtue of the slot 36 on the periphery of nozzle D, said nozzle D may be inserted in member N without the need for special care that would be required if it were necessary to align a single drilled hole with the spring end 40.

Numerous practical tests have been run on blowpipes embodying this invention, and the efficiency and flashback resistance have been found to be excellent. Additionally, the construction of such blowpipes is simple and inexpensive. It has also been found that these blowpipes are operable over a wide range of gas consumption without seriously affecting the degree of flashback resistance.

Thus, it may be seen that a simple and inexpensive, yet highly efficient flashback resistant blowpipe has been provided which is rugged, foolproof and easy to maintain.

We claim:

1. In a blowpipe, the combination of a body having a chamber, said chamber having substantially flat parallel front and rear walls; a substantially cylindrical mixing nozzle in said chamber, said nozzle having substantially identical parallel flat front and rear faces, the rear face thereof being contiguous with said chamber rear wall, and said nozzle having separate fuel gas and combustion-supporting gas passages therethrough having individual orifices in each of said faces; means for spacing said nozzle front face from said chamber front wall to form a mixing gap; means for supplying fuel gas and combustion-supporting gas to said nozzle; and means for conducting a combustible gas mixture from said mixing gap.

2. A blowpipe comprising, in combination, a mixer member having a gas mixture conduit therethrough, and an enlarged recess at the rear thereof having a flat front wall; a body having a socket receiving the rear end of said mixer member, said socket having a flat rear wall parallel to the front wall of said recess, and fuel-gas and combustion-supporting gas supply passages communicating with said socket through openings in said flat rear wall; a substantially cylindrical mixing nozzle disposed in said mixer member recess, said nozzle having gas passages therethrough communicating with the openings in the flat rear wall of said body, and identical flat substantially parallel front and rear faces, said flat rear face being contiguous with the rear wall of said socket to act as a seal between said fuel-gas and combustion-supporting gas passages; and means for coupling said mixer member to said body and urging said flat rear nozzle face against the flat wall of said body.

3. In a blowpipe, the combination of a mixer member having a gas mixture conduit therethrough, and an annular rearwardly extending flange forming an enlarged recess in the rear thereof, the external flange surface having an annular groove therein, and said flange having an aperture therein between said groove and said recess; a mixing nozzle in said recess, said nozzle having an annular groove in the peripheral surface thereof; and a spring ring in said flange groove, said spring ring having an inwardly turned end extending through said aperture and being disposed in said nozzle groove whereby said nozzle is retained in said recess and is longitudinally and rotatably movable therein.

4. For use with a blowpipe, a substantially cylindrical mixing nozzle having flat identical parallel front and rear faces, said nozzle having a substantially axial gas passage of substantially uniform cross-section throughout its length, and a plurality of eccentrically arranged gas passages extending therethrough, said passages each having an individual orifice in each of said faces.

5. In a blowpipe, a gas mixing assembly comprising, in combination, a rear member having a flat surface and gas passages for fuel gas and combustion-supporting gas having openings in said flat surface; a forward member cooperating with said rear member, said forward member having a mixing throat, a combustible gas mixture passage ahead of said throat, and a flat surface parallel to the flat surface of said rear member surrounding the entrance to said throat; and a disc-shaped mixing nozzle clamped between said cooperating members, said nozzle having a flat rear face contiguous with the flat surface of said rear member and a flat front face substantially identical with and parallel to said rear face, said front face being spaced slightly from the flat face surrounding the entrance to said mixing throat to provide a narrow gas passage between said front face and said forward member, said nozzle having an axial fuel gas passage of substantially uniform cross-section throughout its length, and a plurality of eccentrically arranged combustion-supporting gas passages therethrough having individual orifices in the front and rear faces of said nozzle, the orifices of said combustion-supporting gas passages in said nozzle front face being spaced laterally from the entrance to said mixing throat.

6. In a blowpipe, the combination with a mixer member having a gas mixture conduit therethrough and a recess in the rear thereof; and a gas mixing nozzle in said recess; of a spring ring secured on the external surface of said mixer member, said spring ring having an inwardly turned end extending into said recess and loosely engaging said nozzle whereby said nozzle is retained in said recess but is movable therein, said spring ring being actuatable to disengage said inwardly turned end from said nozzle to permit the removal of said nozzle from said recess.

7. In a blowpipe, a mixer member having a gas mixture conduit therethrough and a recess in the rear thereof, said mixer member having a groove; a gas mixing nozzle in said recess having an annular groove in the external peripheral surface thereof; and resilient means disposed within both of said grooves whereby said nozzle is retained positively in said recess, said resilient means being retractable from one of said grooves to permit removal of said nozzle from said recess while keeping said means in the other of said grooves.

8. A blowpipe having a chamber therein; a combustible gas mixture conduit having a passage opening from said chamber, said mixture conduit passage having a diameter less than said chamber; the front and rear walls of said chamber being flat and transverse to the axis of said mixture conduit, and said rear wall having an annular gas-distributing recess therein; a fuel gas conduit having an orifice arranged substantially centrally in the rear wall of said chamber; two combustion-supporting gas conduits opening into said recess at substantially diametrically opposed points; and a disc-shaped mixing nozzle in said chamber having a flat rear face contiguous with the rear wall of said chamber, and a flat front face substantially parallel to said rear face and to said chamber front wall and spaced slightly therefrom to provide a narrow gap, said nozzle having a substantially axial passage therethrough registering at the rear with said fuel gas conduit orifice and adapted to discharge gas axially from the front of said nozzle toward said mixture conduit, and said nozzle having two diametrically opposed eccentrically arranged longitudinal combustion-supporting gas passages therethrough having individual orifices in the rear nozzle face registering with said annular recess and individual orifices in the front nozzle face adjoining the outer edges of said mixing gap and spaced laterally from said mixture conduit.

9. A blow pipe having a chamber provided with flat substantially parallel front and rear walls; and a disc-shaped mixing nozzle removably seated in said chamber, said nozzle having flat parallel front and rear faces and also having parallel gas passages therethrough opening to said faces, said rear face being contiguous with said rear wall, said front face being spaced from said front wall to provide a mixing gap, and said nozzle being symmetrical about its transverse axis.

10. A blowpipe having a chamber, said chamber having flat parallel front and rear walls, the rear wall of said chamber having an annular gas-distributing recess therein; passage means for supplying combustion-supporting gas to said recess; a supply passage for fuel gas having an orifice substantially centrally in said rear wall; a substantially cylindrical mixing nozzle in said chamber, said nozzle having substantially identical flat parallel front and rear faces, said rear face being contiguous with the rear wall of said chamber, and said front face being spaced slightly from the front wall of said chamber to form a mixing gap; said nozzle having an axial fuel gas passage registering with the orifice of said fuel gas supply passage; said nozzle having a plurality of eccentrically arranged combustion-supporting gas passages therethrough, each combustion-supporting gas passage having individual orifices in the front and rear faces of said nozzle, the orifices in said rear face registering with said annular recess; and a combustible gas mixture conduit having an entrance in the front wall of said chamber substantially axially aligned with the axial passage through said nozzle.

11. A blowpipe comprising a handle; a body adjacent to the rear end of said handle having fuel-gas and combustion-supporting gas passages therein; a body adjacent to the front of said handle having a chamber, said chamber having flat parallel front and rear walls, said rear wall having a gas-distributing recess therein; said front body having a fuel gas supply passage having an orifice arranged centrally in the rear wall of said chamber, and a plurality of combustion-supporting gas passages opening into said recess at points spaced from one another; a fuel gas conduit extending between said front and rear bodies; a plurality of combustion-supporting gas conduits extending between said front and rear bodies, each of said last-named conduits being in communication with one of said combustion-supporting gas supply passages; a disc-shaped mixing nozzle in said chamber having identical flat parallel front and rear faces, said rear face being contiguous with the rear wall of said chamber; said nozzle having a plurality of eccentrically arranged passages therethrough registering with said recess, and an axial passage therethrough registering with the orifice of said fuel gas supply passage; and a combustible gas mixture conduit having an entrance in the front wall of said chamber aligned with said axial nozzle passage.

12. In a blowpipe, a mixer member having a combustible gas mixture conduit therethrough and an annular rearwardly extending flange forming an enlarged recess, the front wall of said recess being flat and tranverse to said mixture conduit; a body having a socket receiving the rear end of said mixer member, said body having a boss within said socket spaced from the internal side wall of said socket to form an annular recess wherein said flange fits, said boss having a flat front surface parallel to the front wall of said recess, said body having fuel gas and combustion-supporting gas supply passages having openings in the front surface of said boss; a disc-shaped mixing nozzle in said recess, said nozzle having identical flat substantially parallel front and rear faces, said rear face being contiguous with the front surface of said boss, said front face being spaced slightly from the front wall of said recess, and said nozzle having an axial passage therethrough aligned with said mixture conduit and eccentrically arranged passages therethrough, said passages being in communication with the openings in the surface of said boss, each of said last-named passages having individual orifices in the front and rear faces of said nozzle; and means coupling said mixer member to said body and urging said nozzle against said boss.

HOMER W. JONES.
WILGOT J. JACOBSSON.